(12) United States Patent
Buvat et al.

(10) Patent No.: US 9,446,392 B2
(45) Date of Patent: Sep. 20, 2016

(54) METHOD FOR PREPARING PROTON-CONDUCTING PARTICLES CAPABLE OF CATALYZING THE REDUCTION OF OXYGEN OR THE OXIDATION OF HYDROGEN BY GRAFTING PROTON-CONDUCTING POLYMERS TO THE SURFACE OF THE PARTICLES

(71) Applicants: Commissariat a l'energie atomique et aux energies alternatives, Paris (FR); Centre National de la Recherche Scientifique, Paris (FR)

(72) Inventors: Pierrick Buvat, Montbazon (FR); Anne-Claire Ferrandez, Colleville Montgomery (FR); Steve Baranton, Poitiers (FR); Christophe Coutanceau, Poitiers (FR)

(73) Assignees: COMMISARIAT A L'ENERGIE ATOMIQUE ET AUX ENERGIES ALTERNATIVES, Paris (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 149 days.

(21) Appl. No.: 14/355,925

(22) PCT Filed: Nov. 5, 2012

(86) PCT No.: PCT/EP2012/071859
§ 371 (c)(1),
(2) Date: May 2, 2014

(87) PCT Pub. No.: WO2013/068319
PCT Pub. Date: May 16, 2013

(65) Prior Publication Data
US 2014/0309318 A1    Oct. 16, 2014

(30) Foreign Application Priority Data
Nov. 7, 2011   (FR) ..................................... 11 60117

(51) Int. Cl.
| | |
|---|---|
| B01J 31/12 | (2006.01) |
| C08F 12/30 | (2006.01) |
| C08J 3/12 | (2006.01) |
| H01M 4/90 | (2006.01) |
| H01M 4/92 | (2006.01) |
| H01M 8/10 | (2016.01) |

(52) U.S. Cl.
CPC .............. *B01J 31/123* (2013.01); *C08F 12/30* (2013.01); *C08J 3/12* (2013.01); *H01M 4/9008* (2013.01); *H01M 4/926* (2013.01); *C08F 2438/01* (2013.01); *H01M 2008/1095* (2013.01); *Y02E 60/50* (2013.01)

(58) Field of Classification Search
CPC ........................................................ B01J 31/123
See application file for complete search history.

(56) References Cited

U.S. PATENT DOCUMENTS 7,037,596 B1 *  5/2006  Benthien ................... A61L 9/01
                                                   428/334

OTHER PUBLICATIONS

Li, et al. ("Fabrication of pH-Responsive Nanocomposites of Gold Nanoparticles/Poly(4-vinylpyridine)", Chem. Mater. 2007, vol. 19, pp. 412-417).*
Gal et al. ("Water-Soluble Polymer-Grafted Platinum Nanoparticles for the Subsequent Binding of Enzymes. Synthesis and SANS." Journal of Polymer Science Part A: Polymer Chemistry. vol. 50 No. 2.*
French search Report issued in Patent Application No. 1160117 dated Jul. 4, 2012.
International Search Report issued in Application No. PCT/EP/2012/071859 dated Jun. 5, 2013.
Bach et al., "Synthesis and Characterization of Poly(2-Hydroxyethylmethacrylate)-Functionalized Fe-Au/Core-Shell Nanoparticles", Journal of Applied Polymer Science, Jan. 1, 2011.
Zhang et al., "Preparation of platinum nanoparticles using star-block copolymer with a carboxylic core", Journal of Colloid and Interface Science, Academic Press, New York, NY, US, vol. 298, No. 1, Jun. 1, 2006, pp. 177-182.
Written Opinion issued in Application No. PCT/EP/2012/071859 dated Jun. 5, 2013.

* cited by examiner

*Primary Examiner* — Ling Choi
*Assistant Examiner* — Lanee Reuther
(74) *Attorney, Agent, or Firm* — Pearne & Gordon LLP

(57) ABSTRACT

The invention relates to a method for preparing particles comprising a material capable of catalyzing the reduction of oxygen or the oxidation of hydrogen, said particles being functionalized by polymers comprising at least one repeating unit bearing at least one proton-conducting group, and said particles being covalently bonded to a carbon material, said method comprising: a step a) of contacting particles, comprising a material capable of catalyzing the reduction of oxygen or the oxidation of hydrogen, with a polymer comprising at least one repeating unit bearing at least one proton-conducting group and comprising at least one portion corresponding to an organic radical of a compound that is an initiator for ATRP polymerization, said radical comprising at least one group capable of being grafted onto the surface of said particles, whereby particles, onto which polymers comprising at least one repeating unit bearing at least one proton-conducting group are grafted, are obtained.

7 Claims, No Drawings

METHOD FOR PREPARING PROTON-CONDUCTING PARTICLES CAPABLE OF CATALYZING THE REDUCTION OF OXYGEN OR THE OXIDATION OF HYDROGEN BY GRAFTING PROTON-CONDUCTING POLYMERS TO THE SURFACE OF THE PARTICLES

DESCRIPTION TECHNICAL FIELD

The present invention relates to a method for preparing specific particles capable of catalyzing the reduction of oxygen or the oxidation of hydrogen, said particles being, in addition, proton-conducting thanks to a functionalization of said particles with proton-conducting organic polymers.

Said particles have the characteristic of exhibiting catalytic activity (in particular, for the oxidation of hydrogen or the reduction of oxygen) while having proton conductivity.

Consequently, said particles find their application in the elaboration of electrode materials, in particular materials intended to enter into the constitution of catalytic layers of electrodes for fuel cells, such as fuel cells operating with $H_2$/air or $H_2/O_2$ (known under the abbreviation PEMFC signifying "Proton Exchange Membrane Fuel Cell").

Thus, the present invention lies in the field of fuel cells operating on the principle of the oxidation of hydrogen and the reduction of oxygen.

STATE OF THE PRIOR ART

A fuel cell of this type is an electrochemical generator, which converts chemical energy into electrical energy thanks to two electrochemical reactions: an oxidation reaction, at the anode, of a fuel (hydrogen) combined with a reduction reaction, at the cathode, of an oxidant (air or oxygen).

Conventionally, this type of fuel cell comprises a plurality of electrochemical cells mounted in series, each cell comprising two electrodes of opposite polarity separated by a proton exchange membrane serving as solid electrolyte, said membrane assuring the passage to the cathode of the protons formed, by electrochemical reaction, during the oxidation of the fuel at the anode.

The aforementioned electrochemical reactions (oxidation and reduction) take place at specific zones of the electrodes (known as active zones corresponding structurally to catalytic layers) which form the junction between the diffusion layer (at the level of which the supply of reagents takes place) of the electrodes and the membrane and requiring, to take place, the use of catalysts, which consist, conventionally, for PEMFC type fuel cells, of platinum particles.

Given the costs implied by the presence of a catalyst such as platinum, it is advisable to obtain a maximum catalytic surface for a given weight of metal, such an objective being able to be attained by platinum particles of nanometric sizes (also designated platinum nanoparticles).

It is also advisable, so that the electrochemical reactions can take place, that the platinum particles are in contact both with the fuel or the oxidant (according to whether one is situated at the anode or the cathode), the proton conductor constituting the membrane and the electron conductor entering into the constitution of the electrode (said electron conductor being conventionally a carbon material), said contact zone being known as the triple point, whereby the greater the number of triple points the more efficient the electrode.

In other words, in these triple points, at the level of the platinum particles there is:
- a physical continuity with the electrolytic membrane, to assure a conduction of protons H+;
- a physical continuity with the electron conductor, to assure the conduction of electrons; and
- a physical continuity with the diffusion zone of the electrodes, to assure the diffusion of gases (oxygen or hydrogen for PEMFC fuel cells).

The maintaining over time of these triple points assumes the respect of the integrity of the contact zones between the different elements entering into the constitution of these triple points, which implies maintaining the physical integrity of these different elements, in particular platinum particles.

However, certain studies have shown that it is possible to witness, during the operation of a fuel cell, a degradation of the platinum particles (resulting, consequently, in a reduction of the active surface) either by phenomena of dissolution or by phenomena of increasing the sizes of the particles (stemming, conventionally, from agglomeration phenomena).

These dissolution phenomena can take place with fuel cells operating at very low pH (for example, a pH below 1) and at high operating potentials at the cathode (for example, a potential above 1 V with respect to RHE (RHE signifying reversible hydrogen electrode), the dissolved platinum being able to be found either in the water formed during the operation of the fuel cell or within the electrolytic membrane, generally, polymeric, which leads, therein, to the formation of inactive platinum nanocrystals.

As for size increase phenomena, they can take place with fuel cells in which the platinum nanoparticles have high mobility at the surface of the support, generally carbon, on which they are deposited, this mobility depending on the surface energy thereof.

To overcome these phenomena, resort may be made to high loading levels of platinum particles, with the drawbacks which that represents in terms of production costs, in light of the very high price of platinum on markets.

In order to reduce loading levels while attaining an efficient active surface, studies have focused on the optimization of electrode (here, comprising platinum particles) -membrane assemblies.

Thus, it has been proposed to juxtapose, by intimate contact, the different elements (platinum particles, electrical conductor and electrolyte) required for the creation of the triple points, this juxtaposition being able to consist in:
- mixing platinum particles with carbon powder (fulfilling the role of electrical conductor) and impregnating the whole with electrolyte, so as to guarantee better contact with the membrane;
- depositing, by thin film deposition techniques (such as electro-deposition or sputtering by physical process), platinum particles, which makes it possible to deposit platinum at low concentrations while maintaining very high catalytic activity.

Nevertheless, the assemblies resulting from these techniques are fragile due to the weak bonds involved in juxtaposing the constituent elements of said assemblies, which does not make it possible to prevent phenomena of degradation due to the migration of platinum particles leading to, as a result, a reduction in the lifetime of said assemblies.

In light of the preceding, the authors of the present invention set themselves the objective of proposing a method for manufacturing particles comprising a material capable of catalyzing the oxidation of hydrogen or the reduction of hydrogen, which particles are bound to a proton conductor (to be specific proton-conducting polymers) and, potentially to an electron conductor (such as a carbon material) by stronger bonds than the assemblies existing in the prior art, so as to improve the durability of the triple points, when said particles are intended to be used for the constitution of catalytic layers of PEMFC type fuel cells.

DESCRIPTION OF THE INVENTION

Thus, the invention relates to a method for preparing particles comprising a material capable of catalyzing the reduction of oxygen or the oxidation of hydrogen, said particles being functionalized by polymers comprising at least one repeating unit bearing at least one proton-conducting group, said method comprising a step a) of contacting particles comprising a material capable of catalyzing the reduction of oxygen or the oxidation of hydrogen with a polymer comprising at least one repeating unit bearing at least one proton-conducting group and comprising at least one portion corresponding to an organic radical of a compound that is an initiator for ARTP polymerization, said radical comprising at least one group capable of being grafted onto the surface of said particles and said particles being bonded, for example, by covalence to a carbon material, whereby particles, onto which polymers comprising at least one repeating unit bearing at least one proton-conducting group are grafted, are obtained.

Before going into greater detail in the present description, the following definitions are defined.

Polymer is conventionally taken to mean, according to the invention, a compound constituted of the sequencing of one or more repeating units.

Repeating unit is conventionally taken to mean, according to the invention, a bivalent organic group (i.e. a group forming a bridge) derived from a monomer after polymerization thereof.

ARTP polymerization is taken to mean a radical polymerization by transfer of atoms (ATRP corresponding to "Atom Transfer Radical Polymerization"). The mechanism of this type of polymerization will be given in greater detail below.

Compound that is an initiator for ARTP polymerization is taken to mean a compound comprising at least one group capable of initiating this type of polymerization, the polymerization initiator compound comprising, moreover, a group capable of being grafted onto the surface of the aforementioned particles, which group remains in the radical of initiator compound once it has initiated the polymerization.

Radical of an initiator compound is taken to mean the organic radical that remains of the initiator compound when it has reacted to initiate the polymerization, the radical of initiator compound comprising at least one group capable of being grafted onto the surface of the aforementioned particles, which signifies that this group reacts in the presence of said particles to fix itself by covalence to the surface thereof.

Thus, thanks to the implementation of the method of the invention, it is thereby possible to obtain particles comprising a material capable of catalyzing the reduction of oxygen or the oxidation of hydrogen grafted by covalence via a radical of initiator compound by proton-conducting polymers, which enables, when said particles are intended to enter into the constitution of electrodes (in particular at the level of the catalytic layers thereof) good physical continuity to be assured with the adjacent electrolyte, when it is also based on proton-conducting polymer(s).

As mentioned below, the method of the invention comprises a step a) of contacting particles comprising a material capable of catalyzing the reduction of oxygen or the oxidation of hydrogen with at least one polymer comprising at least one repeating unit bearing at least one proton-conducting group and comprising at least one portion corresponding to an organic radical of a compound that is an initiator for ARTP polymerization, said radical comprising at least one group capable of being grafted onto the surface of said particles, whereby particles, on which polymers comprising at least one repeating unit bearing at least one proton-conducting group are grafted, are obtained.

This contacting step a) may comprise an operation of dispersion of the aforementioned particles, for example, in an electrophilic solvent (such as an amine solvent, like hexylamine) followed by an operation of contacting the dispersion obtained with one or more polymers as defined above in conditions sufficient to enable the grafting by covalence of said polymers via a radical of the compound that is an initiator for ARTP polymerization.

The particles comprising a material capable of catalyzing the reduction of oxygen or the oxidation of hydrogen may be metal particles, namely particles comprising one or more metal elements (in which case, when there are several metal elements, one could speak of particles made of metal alloy(s)).

Particularly suitable metal particles may be particles comprising a noble metal, such as platinum, ruthenium, palladium and mixtures thereof.

When the particles obtained according to the invention are intended to be used in PEMFC fuel cells, the metal particles are advantageously platinum particles.

The radical of initiator compound is a radical of a compound that is an initiator for ATRP polymerization, namely a compound comprising at least one group capable of initiating ATRP polymerization.

The radical of initiator compound may be a radical of an organic halide compound (namely, a compound comprising at least one halogen atom bound to a carbon atom, the resulting group being able to be symbolized by —C—X, X representing a halogen atom) comprising at least one group selected from —S—S— and —SH, —S—S— being a divalent disulfide group, i.e. a disulfide group forming a bridge between two other groups and —SH being a monovalent thiol group.

The group capable of being grafted onto the surface of particles consists, for this type of compound, of a group selected from —S—S— and —SH.

The radical may be, more specifically, a radical of a compound comprising a disulfide group —S—S— forming a bridge between two portions of said compound, at least one of said two portions comprising a phenyl group bearing an amide group —NH—CO—$R^1$, $R^1$ being a hydrocarbon group bearing at least one halogen atom (it is understood, in this case, that the amide group is bound to a carbon atom of the phenyl group via the nitrogen atom of the —NH— group).

The aforementioned two portions may be identical.

In particular, the radical may be a radical of a particular compound meeting the definition given above or may be a compound of formula (I) below:

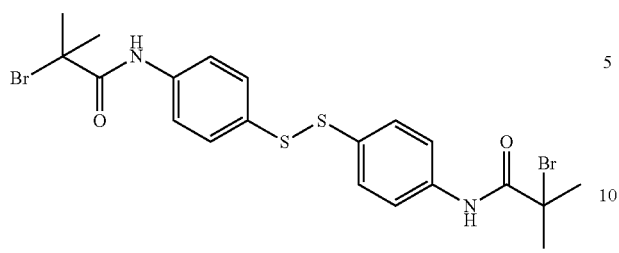

said radical thus being able to be represented by the following formula (II):

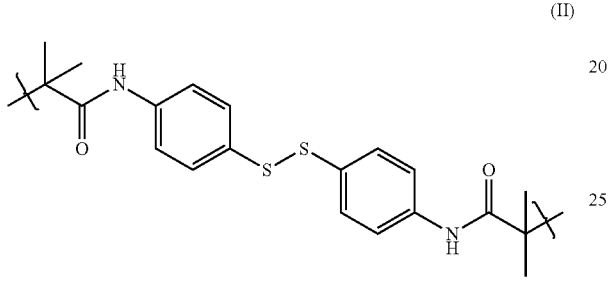

the braces indicating the places at which said radical is fixed, in this case to a first polymer chain and to a second polymer chain.

Concerning the polymer, the proton-conducting group may be a sulfonic acid group —$SO_3H$, a carboxylic acid group —$CO_2H$ or a phosphonic acid group —$PO_3H_2$, said groups being able to be present potentially in the form of salts.

The polymer may belong to the family of polysulfones, polyetherketones, polyphenylenes, polystyrenes, fluorinated aliphatic polymers, it being understood that said polymers must comprise proton-conducting groups, for example sulfonic acid, phosphonic acid or carboxylic acid groups.

In particular, the polymer may be a polymer derived from the polymerization of one or more monomers selected from:
- ethylenic monomers bearing at least one sulfonic acid group, potentially in the form of a salt;
- ethylenic monomers bearing at least one carboxylic acid group, potentially in the form of a salt; and
- ethylenic monomers bearing at least one phosphonic acid group, potentially in the form of a salt.

These monomers may be potentially fluorinated.

Even more particularly, said monomers may meet the following formula (III):

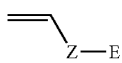

(III)

in which:
- —Z corresponds to a phenyl group; and
- —E corresponds to a proton-conducting group, potentially in the form of a salt, such as a sulfonic acid group, a phosphonic acid group or a carboxylic acid group.

In particular, the polymer may be derived from the polymerization of at least one monomer of aforementioned formula (III) in the presence of an initiator compound of aforementioned formula (I).

A specific monomer meeting the definition given above is a styrene sulfonic acid monomer, for example in the form of a salt, such as a sodium salt (in which case, one could speak of sodium styrene sulfonate).

An example of this type of monomer is a monomer of following formula (IV):

in which $R^1$ is a hydrogen atom or a cation (for example, a cation of alkaline metal).

Thus, a specific polymer intended to be contacted with the aforementioned particles may be a polymer meeting the following formula (V):

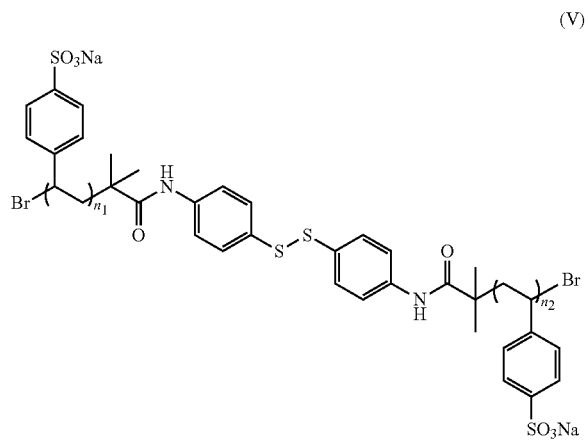

this polymer comprising a first polymer chain and a second polymer chain bound on either side of the radical of formula (II) as defined above, $n_1$ and $n_2$ correspond to the number of repetitions of the unit taken between brackets.

When the group capable of being grafted is a disulfide group —S—S—, the polymer, in the presence of particles, is going to split into two organic radicals by homolytic cleavage of the bond between the two sulfur atoms, the two radicals consisting of radical species, the free electrons being situated at the sulfur atoms, said free electrons each combining with an electron present at the surface of the particles to form a covalent bond between the aforementioned radicals and the particles via the sulfur atoms, the resulting product being able to be schematized in the following manner:

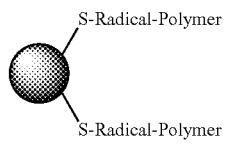

the full sphere corresponding to a particle, —S— Radical- corresponding to a radical of compound initiator forming a bridge between the particle and the polymer (respectively, a first polymer chain and a second polymer chain).

When the group capable of being grafted is a thiol group —SH, the radical of initiator compound bound to a polymer, in the presence of particles, reacts via said group with the surface of the particles to form a covalent bond with them, whereby a radical remains of formula identical to that mentioned above, if it is not the fact that the hydrogen atom bound to the sulfur atom is replaced by a covalent bond between the sulfur and a particle.

Prior to step a), the method of the invention may comprise a step of preparing by ATRP polymerization the polymer mentioned in step a).

As indicated above, this preparation step is governed by the mechanisms of ATRP polymerization, which operates on the principle of the reversible and rapid formation of species known as "dormant species" by creation of a covalent bond with a reactive radical species.

This polymerization step is carried out in the presence of one or more monomers and a compound that is an initiator for ATRP polymerization.

The compound that is an initiator for ATRP polymerization is a compound comprising at least one group capable of initiating ATRP polymerization, i.e. a group capable of cleaving at a bond to form a first radical species and a second radical species, the first radical species reacting subsequently with a first carbon bearing a double bond belonging to the monomer, the second radical species fixing itself to a second atom opposite the first carbon bearing the double bond.

In other words, this mechanism may be summarized according to the following reaction scheme:

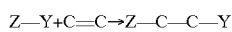

Z—Y corresponding to the aforementioned initiator with Z corresponding to the first species and Y corresponding to the second species, the Z—C—C—Y species being a dormant species, which can grow by successive additions of monomers on free radicals, as in a conventional radical polymerization, the free radicals being created by departure of the Y group, which is then fixed after insertion of the monomer at the end of the polymer chain, which still constitutes a dormant species, which can continue to grow as long as monomers remain in the polymerization medium.

For reasons of simplicity, only the double bond of the monomer has been represented above.

Moreover, the initiator compound used within the scope of this preparation step comprises at least one group capable of being grafted onto the surface of the aforementioned particles, i.e. a group capable of reacting with the surface of said particles to form a covalent bond, whereby a radical of this initiator bound in a covalent manner to the surface of said particles remains.

The initiator compound used within the scope of this step may be an organic halide compound (namely, a compound comprising at least one halogen atom bound to a carbon atom, the resulting group being able to be symbolized by —C—X, X representing a halogen atom) comprising at least one group selected from —S—S— and —SH, —S—S— being a divalent disulfide group, i.e. a disulfide group forming a bridge between two other groups of the compound and —SH being a monovalent thiol group.

In this type of compound, the group capable of initiating ARTP polymerization is the —C—X group mentioned above, said group being able to cleave, in a homolytic manner, at the carbon-halogen bond to form two radical species, a first carbon radical species (being able to be symbolized by —C.) and a second radical species consisting of a halogen radical (being able to be symbolized by X.), the first species reacting with one end of the double bond of the monomer and the second species reacting with the opposite end of the double bond.

The group capable of being grafted onto the surface of the particles consists, for this type of compound, of a group selected from —S—S— and —SH.

This type of compound is particularly adapted with a view to being grafted onto the surface of platinum particles.

Compounds meeting this specificity may be compounds comprising a disulfide group —S—S—, in particular, symmetrical compounds, i.e. compounds comprising a symmetry around the disulfide bond, which signifies, in other words, that the two portions of the compound situated on either side of the disulfide bond are identical.

More specifically, compounds meeting this specificity may be compounds comprising a disulfide group —S—S— forming a bridge between two portions of said compounds, at least one of said two portions comprising a phenyl group bearing an amide group —NH—CO—$R^1$, $R^1$ being a hydrocarbon group bearing at least one halogen atom (it is understood, in this case, that the amide group is bound to a carbon atom of the phenyl group via the nitrogen atom of the —NH— group).

The aforementioned two portions may be identical.

A particular compound meeting the definition given above may be a compound of formula (I) below:

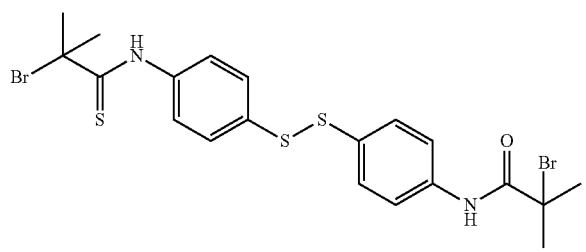

(I)

This type of compound may be synthesized by an acylation reaction between an aminophenyl disulfide compound and an acyl chloride compound, in basic medium and organic solvent and in the potential presence of a catalyst, said acylation reaction taking place according to an addition-fragmentation mechanism.

As an example, when it involves preparing a compound of aforementioned formula (I), the acylation reaction may take place between a 4-aminophenyl disulfide compound and a bromoisobutyrate compound according to the following reaction scheme:

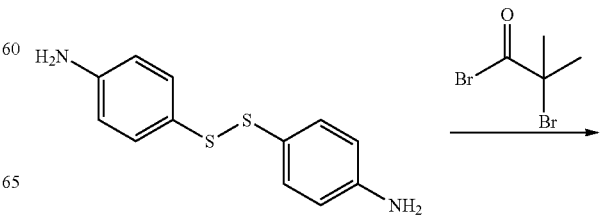

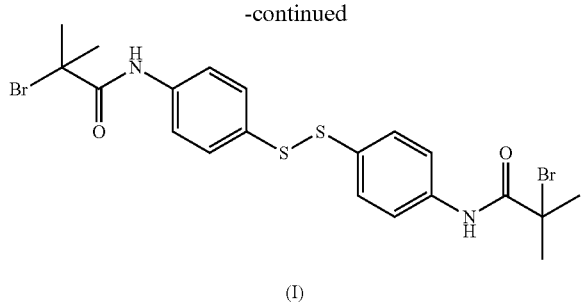

(I)

this reaction being able to be carried out with bipyridine, as catalyst, chloroform as organic solvent, in a temperature range extending from 0° C. to room temperature.

The monomers capable of being used within the scope of the polymerization step may be all types of monomers compatible with ATRP polymerization and comprising at least one proton-conducting group potentially in the form of a salt.

Said monomers may in particular be chosen such that, after polymerization, they form polymer chains belonging to the family of polysulfones, polyetherketones, polyphenylenes, polystyrenes, fluorinated aliphatic polymers, it being understood that said polymers must comprise proton-conducting groups, for example sulfonic acid, phosphonic acid or carboxylic acid groups.

In particular, the monomers may be:
ethylenic monomers bearing at least one sulfonic acid group, potentially in the form of a salt;
ethylenic monomers bearing at least one carboxylic acid group, potentially in the form of a salt; and
ethylenic monomers bearing at least one phosphonic acid group, potentially in the form of a salt.

These monomers may be potentially fluorinated.

Even more particularly, these monomers may meet the following formula (III):

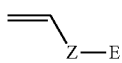

(III)

in which:
—Z corresponds to a phenyl group; and
—E corresponds to a proton-conducting group, potentially in the form of a salt, such as a sulfonic acid group, a phosphonic acid group or a carboxylic acid group.

A specific monomer meeting the definition given above is a styrene sulfonic acid monomer, for example in the form of a salt, such as a sodium salt (in which case, one could speak of sodium styrene sulfonate).

An example of this type of monomer is a monomer of following formula (IV):

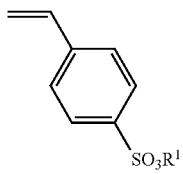

(IV)

in which $R^1$ is a hydrogen atom or a cation (for example, a cation of alkaline metal).

Apart from the presence of one or more monomers as defined above, the polymerization step takes place, conventionally, in the presence of a metal salt (for example, a metal halide, such as a copper halide, like copper chloride) and an organic ligand.

It is pointed out that organic ligand is taken to mean an organic compound comprising at least one free doublet capable of filling an electron vacancy of a metal element (to be specific, in our case, an electron vacancy on the metal element of the aforementioned salt) to form a metal complex.

As an example, a suitable organic ligand may be a compound belonging to the family of pyridine compounds, such as bipyridine.

The polymerization step may be carried out, moreover, in a water/organic solvent mixture (for example, an alcoholic solvent) under flow of an inert gas (such as a flow of argon) at a suitable temperature and for a suitable time to bring about polymerization.

Moreover, this polymerization step may be followed by a step of hydrolysis intended to protonate the proton conducting groups, when they are in the form of a salt (i.e., in other words, this step consists in replacing the cations of the salt by hydrogen atoms).

The average molar masses of the polymers obtained at the end of the polymerization step may extend from 1000 to 1 000 000 g/mol, preferably 2000 to 200 000 g/mol.

Prior to step a), the method of the invention may also comprise a step of preparing said aforementioned particles, namely particles comprising a material capable of catalyzing the oxidation of hydrogen or the reduction of oxygen.

When the particles are metal particles, the preparation of the latter may consist in reducing a metal salt by reacting it with a reducing agent.

For example, when the metal particles are platinum particles, they may be prepared by reduction of a platinum salt with a reducing agent.

The platinum salt may be platinum halide salt, potentially hydrated, such as $H_2PtCl_6 \cdot 6H_2O$.

The reducing agent may be metal hydride, and more particularly a metal borohydride, such as sodium borohydride ($NaBH_4$).

The preparation may be carried out in a medium of the "oil-in-water" type, the oil being able to correspond to a hydrocarbon compound, such as hexane.

From a practical viewpoint, the preparation of platinum particles in such a medium may take place through the implementation of the following operations:
an operation of contacting a platinum salt (for example, $H_2PtCl_6 \cdot H_2O$) dissolved beforehand in water with a medium comprising an oil and potentially a dispersing agent (for example, tetraethylglycol dodecylether);
an operation of adding to the mixture resulting from the preceding operation a reducing agent, in one or more steps, at the end of which the resulting mixture is stirred for a sufficient time up to the cessation of any release of gas (this cessation indicating that the reduction reaction has finished).

The final mixture thus comprises platinum particles, which mixture may be used as such for the implementation of step a) (it could thus be said that step a) is carried out in situ).

In a variant, the final mixture may be treated (for example, by filtration) so as to isolate the platinum particles obtained, the latter being intended to be used for the implementation of step a).

Apart from the fact that the particles obtained according to the method of the invention are functionalized by polymers comprising at least one repeating unit bearing at least one proton-conducting group or precursor thereof, said particles are also bound (for example, by covalence) to a carbon material (being able to be assimilated with a carbon support), such as graphite, carbon black, carbon fibers, carbon tubes (such as carbon nanotubes), graphene and mixtures thereof.

The bond to a carbon material may take place at different moments of the implementation of the method of the invention.

According to a first embodiment, the particles may be used already bound to a carbon material during the implementation of step a).

These particles already bound to a carbon material may be prepared prior to the step of implementation of step a).

In this case, the method of the invention may comprise, before the implementation of step a), a step of preparing particles comprising a material capable of catalyzing the reduction of oxygen or the oxidation of hydrogen bound to a carbon material.

According to a first variant, when the particles are metal particles, the preparation of the latter may comprise:
- an operation of reducing a metal salt by reacting it with a reducing agent, whereby metal particles are obtained;
- an operation of contacting the medium resulting from the preceding operation with the carbon material intended to be bound to the particles, whereby metal particles bound to a carbon material are obtained.

For example, when the metal particles are platinum particles, the reduction step consists in reducing a platinum salt with a reducing agent.

The platinum salt may be a platinum halide salt, potentially hydrated, such as $H_2PtCl_6.6H_2O$.

The reducing agent may be a metal hydride, and more particularly a metal borohydride, such as sodium borohydride ($NaBH_4$).

The preparation may be carried out in a medium of the "oil-in-water" emulsion type, the oil being able to correspond to a hydrocarbon compound, such as hexane.

From a practical viewpoint, the preparation of platinum particles in such a medium, before contacting with the carbon material, can take place through the implementation of the following operations:
- an operation of contacting a platinum salt (for example, $H_2PtCl_6$-$H_2O$), dissolved beforehand in water, with a medium comprising an oil and potentially a dispersing agent;
- an operation of adding to the mixture resulting from the preceding operation a reducing agent, at the outcome of which the resulting mixture is stirred for a sufficient time up to the cessation of any release of gas (this cessation indicating that the reduction reaction has finished), whereby a mixture comprising platinum particles is obtained.

This mixture comprising platinum particles is then contacted with the carbon material, preferably under ultrasounds, whereby, at the end of this contacting operation, a final mixture comprising platinum particles bound to the carbon material is obtained, which mixture may be used as such for the implementation of step a).

In a variant, this final mixture may be treated (for example, by filtration) so as to isolate the platinum particles obtained, the latter being intended to be used for the implementation of step a).

According to a second variant, when the particles are metal particles, the preparation may consist in a reduction step, by means of a reducing agent, of a mixture comprising a metal salt and a carbon material, by reacting it with a reducing agent, whereby metal particles bound to the carbon material are obtained.

For example, when the metal particles are platinum particles, the reduction step consists in reducing a platinum salt with a reducing agent.

The platinum salt may be a platinum halide salt, potentially hydrated, such as $H_2PtCl_6.6H_2O$.

The reducing agent may be a metal hydride, and more particularly a metal borohydride, such as sodium borohydride ($NaBH_4$).

Even more specifically, the preparation of platinum particles bound to a carbon material may take place through the implementation of the following operations:
- an operation of contacting a basic aqueous solution (for example, based on lithium carbonate) of a platinum salt (for example, $H_2PtCl_6$-$H_2O$) with the carbon material;
- an operation of adding to the mixture resulting from the preceding operation a reducing agent, at the end of which the resulting mixture is stirred for a sufficient time until a mixture comprising platinum particles bound to the carbon material is obtained.

Said mixture may be treated (for example, by filtration) so as to isolate the platinum particles obtained, the latter being intended to be used for the implementation of step a).

According to a second embodiment, the particles may be used, during the implementation of step a), in a form not bound to the carbon material, which implies, in this case, that the method of the invention comprises, after step a) a step of contacting the particles obtained at the end of step a) with the carbon material (designated hereafter step a'), whereby said particles are bound at the end of this step to the carbon material.

More specifically, this step of contacting with the carbon material may be carried out under ultrasounds, so as to activate the collision of the particles with the carbon material to form a bond between said particles and the material.

For the first embodiment (in other words the embodiment in which the particles are used already bound to a carbon material before the implementation of step a)), step a) may be carried out by the following operations:
- an operation of dispersing the particles in an electrophilic organic solvent, such as an amine solvent (like hexylamine), this type of solvent contributing to assuring good stabilization of the dispersion, whereby a dispersion of particles is obtained comprising a material capable of catalyzing the oxidation of hydrogen or the reduction of oxygen bound to a carbon material;
- an operation of contacting the aforementioned dispersion with a polymer as defined above, preferably dissolved beforehand in water;
- potentially, an operation of washing the particles obtained, for example, by precipitation/ centrifugation cycles, so as to eliminate any traces of initiator compound not having reacted.

For the second embodiment (i.e. the embodiment for which the method of the invention comprises, after step a), a step of contacting the particles obtained at the end of step a) with the carbon material (designated hereafter step a'), whereby said particles are bound at the end of this step to the carbon material), the method of the invention may comprise:

- a step of preparing particles comprising a material capable of catalyzing the oxidation of hydrogen or the reduction of oxygen;
- a step a), as defined above, of contacting, in the synthesis medium of the preceding step, a polymer as defined above with the particles obtained beforehand;
- a step of contacting particles derived from step a) with a carbon material, so as to obtain particles bound to a carbon material.

When the particles are metal particles, the step of preparing the latter may comprise an operation of reducing a metal salt by reacting it with a reducing agent, whereby metal particles are obtained.

For example, when the metal particles are platinum particles, the reduction step consists in reducing a platinum salt with a reducing agent.

The platinum salt may be a platinum halide salt, potentially hydrated, such as $H_2PtCl_6 \cdot 6H_2O$.

The reducing agent may be a metal hydride, and more particularly a metal borohydride, such as sodium borohydride ($NaBH_4$).

The preparation may be carried out in a medium of "oil-in-water" emulsion type, the oil being able to correspond to a hydrocarbon compound, such as hexane.

From a practical viewpoint, the preparation of platinum particles in such a medium, before contacting the initiator compound then the carbon material, may take place by the implementation of the following operations:

- an operation of contacting a platinum salt (for example, $H_2PtCl_6\text{-}H_2O$) dissolved beforehand in water with a medium comprising an oil and potentially a dispersing agent;
- an operation of adding to the mixture resulting from the preceding operation a reducing agent, at the end of which the resulting mixture is stirred for a sufficient time up to the cessation of any release of gas (this cessation indicating that the reduction reaction has finished), whereby a mixture comprising platinum particles is obtained.

The contacting step a) may take place by introduction of the polymer into aqueous medium, so as not to perturb the synthesis medium of the particles.

The step of contacting with the carbon material may take place by introducing it directly into the synthesis medium and subjecting the resulting mixture to an ultrasound treatment, so as to cause the bonding of the carbon material to the particles.

This embodiment makes it possible to carry out a one-pot synthesis of particles bound to a carbon material and grafted to polymers as defined above via radicals of the compound that is an initiator for ATRP polymerization.

According to a third embodiment, the method of the invention comprises a step of preparing particles made of a material capable of catalyzing the reduction of oxygen or the oxidation of hydrogen bound to a carbon material, this step being carried out concomitantly with step a).

In this case, when the particles are metal particles, the preparation of the latter being carried out concomitantly with step a) comprises:

- a step of contacting a metal salt, a carbon material, in basic medium, with a polymer as defined above in step a);
- a step of adding to the mixture resulting from the preceding step a reducing agent, whereby particles according to the invention result, namely metal particles bound to a carbon material and to polymers as defined above;
- potentially a step of isolating the particles thereby obtained.

For example, when the particles are platinum particles, the preparation of the latter carried out concomitantly with step a) comprises:

- a step of contacting a platinum salt (for example, $H_2PtCl_6\text{-}H_2O$), a carbon material (such as carbon black) with a basic aqueous solution (for example, based on lithium carbonate) and with a polymer as defined for step a);
- a step of adding to the mixture resulting from the preceding step a reducing agent, at the end of which the resulting mixture is stirred for a sufficient time until a final mixture comprising platinum particles bound to the carbon material and to the aforementioned polymer is obtained.

According to this third embodiment, in quite an unexpected manner, the presence of the polymer, from the start, does not modify the reactivity of the metal salt or the mechanism of formation of the particles, which is particularly advantageous, because it may thus be envisaged to manufacture said particles according to a method known as "one pot".

Whatever the embodiment undertaken, the level of grafting of polymer(s) (expressed in weight percent of polymer in the particles) may extend from 1 to 25% by weight, ideally between 2 and 15% by weight.

The particles capable of being obtained by the method of the invention are particles comprising a material capable of catalyzing the reduction of oxygen or the oxidation of hydrogen, said particles being functionalized by polymers comprising at least one repeating unit bearing at least one proton-conducting group, said polymers being bound to said particles via a spacer group, which is a radical of the compound that is an initiator for ATRP polymerization bound in a covalent manner to said particles (the radical corresponding to the radical of initiator compound, after it has reacted, on the one hand, by means of one of its groups, with the particles to form a covalent bond and, on the other hand, by means of another of its groups with a monomer) whereby the polymers are bound in a covalent manner to the radical of initiator compound and said particles being, moreover, bound, for example, in a covalent manner, to a carbon material.

Such particles are particularly interesting, because they make it possible to transpose the phenomenology of the triple point to the molecular scale, the role of the catalyst being fulfilled by the material constituting the particle as such, the role of the proton conductor being fulfilled by the aforementioned polymers and the role of the electron conductor being fulfilled by the carbon material. The covalent bonds between the electron conductor and the catalyst on the one hand and between the proton-conducting material and the catalyst on the other hand assures, firstly, a better transfer of the charges (respectively, electrons and protons) and thus better performances and, secondly, perfect stability in fuel cell operating conditions, when said particles are used in fuel cells. These two results make it possible to reduce the catalyst load rate for increased performances.

As already mentioned for the method, the particles comprising a material capable of catalyzing the reduction of oxygen or the oxidation of hydrogen may be metal particles, namely particles comprising one or more metal elements (in which case, when there are several metal elements, one could speak of particles made of metal alloy(s).

Particularly suitable metal particles may be particles comprising a noble metal, such as platinum, ruthenium, palladium and mixtures thereof.

When the particles obtained according to the invention are intended to be used in PEMFC fuel cells, the metal particles are advantageously platinum particles.

The radicals of initiator compound may be radicals of an initiator compound as defined for the above method, in particular, a compound comprising a disulfide group —S—S— forming a bridge between two portions of said compound, at least one of said two portions comprising a phenyl group bearing an amide group —NH—CO—$R^1$, $R^1$ being a hydrocarbon group bearing at least one halogen atom (it is understood, in this case, the amide group is bound to a carbon atom of the phenyl group via the nitrogen atom of the group —NH—).

The polymers comprising at least one repeating unit bearing at least one proton-conducting group are similar to those already described for the above method and may be, in particular, polymers belonging to the family of polysulfones, polyetherketones, polyphenylenes, polystyrenes, fluorinated aliphatic polymers, it being understood that said polymers must comprise proton-conducting groups, for example sulfonic acid, phosphonic acid or carboxylic acid groups.

As for the carbon material, when it is present, it may be graphite, carbon black, carbon fibers, carbon tubes (such as carbon nanotubes), graphene.

As an example, when the particles are platinum particles, the initiator compound is a compound of formula (I), the monomer is a monomer of formula (IV) and the carbon material is carbon black, the resulting particles are platinum particles, to which are bound, in a covalent manner, radicals of the initiator compound of following formula:

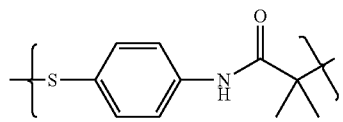

this radical being bound to the particles via the sulfur atom, the other end being bound to polymers comprising a sequence of repeating units derived from the polymerization of the monomer of formula (IV). The average molar masses by weight of the polymers grafted onto the surface of the particles may extend from 1000 to 1 000 000 g/mol, ideally 2000 to 200 000 g/mol.

The ratio between the carbon material and platinum may be comprised between 80/20 and 20/80, ideally between 45/55 and 65/35.

The particles of the invention may enter into the constitution of electrodes for fuel cells, in particular PEMFC type fuel cells, more particularly in catalytic layers of electrodes of fuel cells.

These particles do not show any sign of degradation below 200° C. Furthermore, the electrochemical resistance of the organic crown (constituted of the polymers grafted to the particles) has been demonstrated in a range of potentials from 0 to 1 V vs RHE (RHE signifying reversible hydrogen electrode), which makes it possible to envisage using these particles as catalysts for PEMFC type fuel cells.

These particles can be dispersed in an alcoholic solution. It is possible to mix them with a proton-conducting ionomer in proportions extending from 100/0 to 70/30. The solution may then be deposited on any type of porous carbon support (fabric or felt) and used as fuel cell electrode.

The fuel cell properties (current/voltage curve) of these particles are better than those that are obtained with equivalent electrodes (same platinum filling rate) obtained by simple mixing of carbon, platinum and proton-conducting polymer.

Furthermore, these particles have an electro-catalytic activity even when they are implemented without Nafion type ionomer. This particularly remarkable result makes it possible to form electrodes without Nafion. Combined with membranes alternative to Nafion, these particles will make it possible to form membrane/electrode assemblies free of any Nafion.

Thus, fuel cells, for example of PEMFC type, comprise, conventionally, at least one electrode-membrane-electrode assembly, in which at least one of its electrodes is based on particles according to the invention.

The membrane for its part may be based on a proton-conducting polymeric material, the polymer(s) constituting said material being able to be of same nature as the polymer(s) grafted onto the surface of said particles.

Among the initiator compounds used within the scope of this invention, certain are novel, these initiator compounds being compounds comprising a disulfide group —S—S— forming a bridge between two portions of said compounds, at least one of these two portions comprising a phenyl group bearing an amide group —NH—CO—$R^1$, $R^1$ being a hydrocarbon group bearing at least one halogen atom (it is understood, in this case, that the amide group is bound to a carbon atom of the phenyl group via the nitrogen atom of the group —NH—).

The aforementioned two portions may be identical.

A particular compound meeting the definition given above may be a compound of formula (I) below:

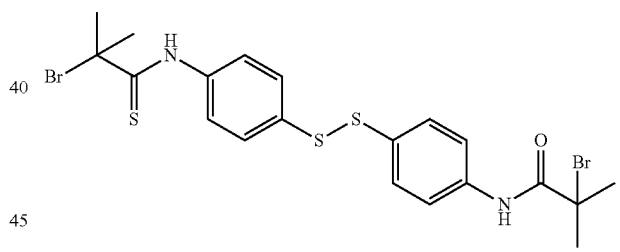

(I)

Among the polymers used within the scope of step a), certain also are novel, said polymers comprising:

- a median organic group comprising a disulfide group —S—S— forming a bridge between two identical portions, each of said portions comprising a phenyl group bearing an amide group —NH—CO—$R'^1$-, $R'^1$ being a divalent hydrocarbon group;
- two polymer chains comprising at least one repeating unit bearing at least one proton-conducting group each bound to the median organic group via the group —$R'^1$-.

Schematically, this type of polymer may be represented by the following formula:

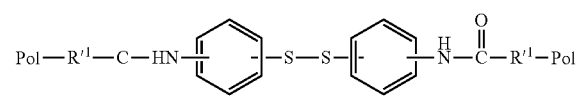

Pol corresponding to a polymer chain.

Concerning the polymer chains, the proton-conducting group may be a sulfonic acid group —$SO_3H$, a carboxylic acid group —CO$_2$H or a phosphonic acid group —PO$_3$H$_2$, said groups being able to be present potentially in the form of salts.

The polymer chains may belong to the family of polysulfones, polyetherketones, polyphenylenes, polystyrenes, fluorinated aliphatic polymers, it being understood that said chains must comprise proton-conducting groups, for example sulfonic acid or phosphonic acid groups.

In particular, the polymer chains may be derived from the polymerization of one or more monomers selected from:
- ethylenic monomers bearing at least one sulfonic acid group, potentially in the form of a salt;
- ethylenic monomers bearing at least one carboxylic acid group, potentially in the form of a salt; and
- ethylenic monomers bearing at least one phosphonic acid group, potentially in the form of a salt.

Said monomers may be potentially fluorinated.

Even more particularly, said monomers may meet the following formula (III):

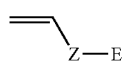

(II)

in which:
- Z corresponds to a phenyl group; and
- E corresponds to a proton-conducting group, potentially in the form of a salt, such as a sulfonic acid group, a phosphonic acid group or a carboxylic acid group.

A specific monomer meeting the definition given above is a styrene sulfonic acid monomer, for example in the form of a salt, such as a sodium salt (in which case, one could speak of sodium styrene sulfonate).

An example of this type of monomer is a monomer of following formula (IV):

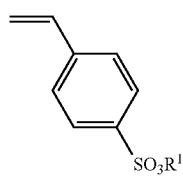

(IV)

in which R$^1$ is a hydrogen atom or a cation (for example, a cation of alkaline metal).

A specific polymer according to this definition may be a polymer meeting the following formula (V):

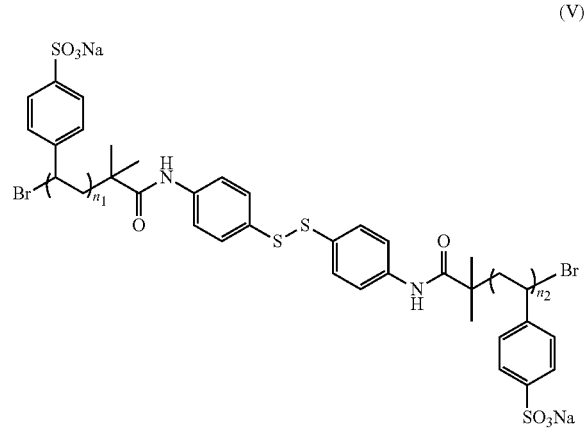

(V)

$n_1$ and $n_2$ corresponding to the number of repetitions of the unit taken between brackets.

The invention will now be described, with respect to the following examples given by way of illustration and non-limiting.

DETAILED DESCRIPTION OF PARTICULAR EMBODIMENTS

EXAMPLE 1

This example illustrates the preparation of the compound 2-bromo-N-{4-[4-(2-bromo-2-methylpropionylamino)-phenyldisulfanyl]-phenyl}-2-methylpropionamide of following formula (I):

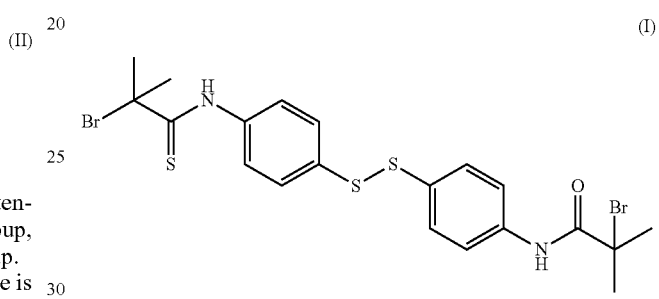

(I)

according to the following reaction scheme:

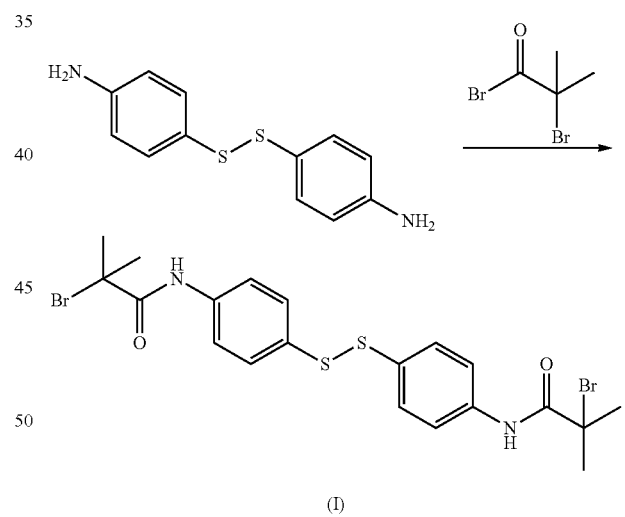

(I)

To do so, in a round bottomed flask equipped with a magnetic stirrer, 4-aminophenyl disulfide (248 mg; 1 mmol; 1 eq.) and bipyridine (343.6 mg; 2.2 mmol; 2.2 eq.) are dissolved in chloroform (10 mL). The reaction mixture is cooled by placing the round bottomed flask in a bath at 0° C. Bromoisobutyrate (272 µL; 2.2 eq.) is added drop by drop to the mixture thereby cooled. The resulting mixture is stirred for 10 hours, then the temperature is left to rise to room temperature. Water (10 mL) is poured into the round bottomed flask and the resulting mixture is then transferred into a separating funnel, so as to separate an aqueous phase and an organic phase.

The aqueous phase is washed with dichloromethane, whereby another organic phase is isolated.

The organic phases are combined then dried with magnesium sulfate (MgSO$_4$) then filtered. The resulting phase is then evaporated under vacuum in a rotating evaporator, so as to eliminate the organic solvents. The resulting product is purified on a chromatographic column on silica gel with, firstly, dichloromethane as eluent then, secondly, a dichloromethane/methanol mixture as eluent (90/10).

The resulting product (with a yield of 92%) corresponds to the expected product of formula (I) above according to 1H NMR spectroscopy, 13C NMR spectroscopy, IR spectroscopy analyses and elementary analysis, the results of which are given below.

$^1$H NMR (200.13 MHz, CDCl$_3$) δ: 8.47 (s, 1H, NH), 7.56-7.42 (m, 4H, Harom), 2.04 (s, 6H, CH3) ppm.

$^{13}$C NMR (200.13 MHz, CDCl$_3$) δ: 170.1 (C=O), 137.2 (NH-Carom), 132.9 (S-Carom), 130.1 (HN-Carom-CHarom-CHarom-S), 120.6 (H$_2$N-Carom-CHarom-CHarom-S), 63.1 (Br—C—(CH$_3$)$_2$, 32.6 (CH$_3$) ppm.

IR (cm−1): 3300 (N—H), 1615 (C=O), 1086 (C—S), 570 (C—Br).

Elementary analysis (in %): (C$_{20}$H$_{22}$Br$_2$N$_2$O$_2$S$_2$), C: 42.5; H: 4.2; Br: 30; N: 4.3; O: 7.9; S: 11.1.

EXAMPLE 2

This example illustrates the preparation of a polymer which can be schematized by the following formula below:

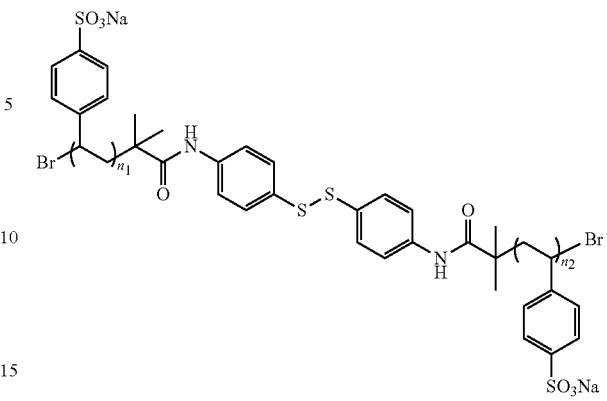

with n$_1$ and n$_2$ corresponding to the number of repetitions of the unit taken between brackets, this polymerization being carried out according to the following reaction scheme:

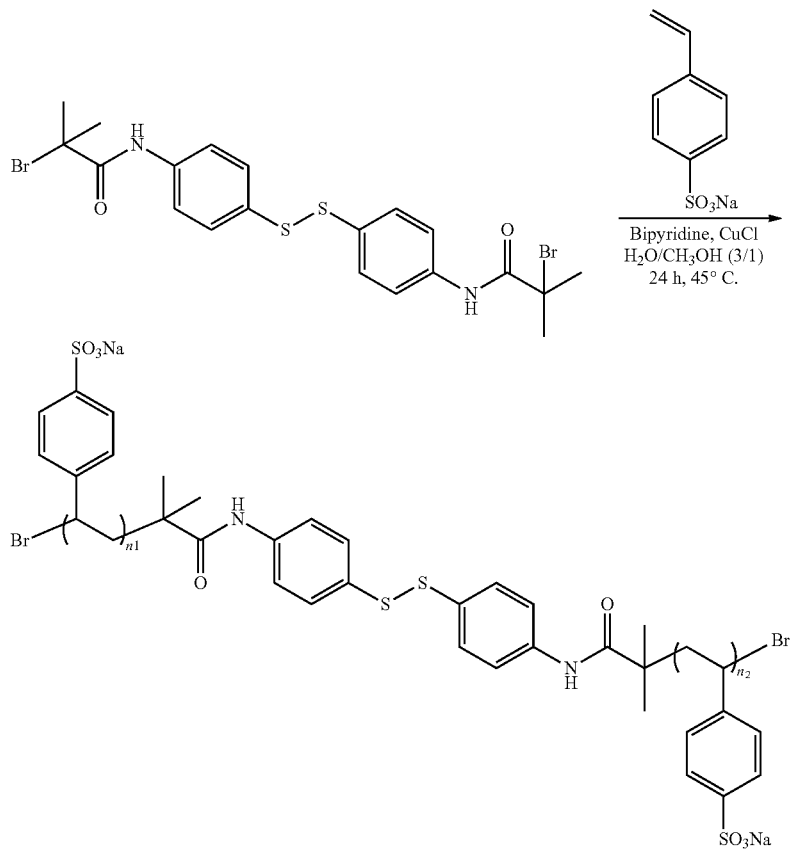

In a two-necked flask equipped with a magnetic stirrer dried beforehand by vacuum/argon cycles, sodium styrene sulfonate is dissolved (cf. the quantities indicated in table according to the different tests carried out) in a water/methanol (3/1) mixture under argon flow. Bipyridine (115 mg, 0.73 mmol, 8 eq.) and copper chloride (36.4 mg, 0.37 mmol, 4 eq.) are then added.

Finally under argon, the initiator compound prepared in example 1 (50 mg, 0.1 mmol, 1 eq.) is added to the reaction mixture. The polymerization reaction is carried out for 20 h at 45° C. under a flow of argon. The reaction is stopped by opening the round bottomed flask to air. The reaction mixture is firstly filtered on silica in order to eliminate the copper chloride. Then the polymer is isolated while eliminating water in a rotating evaporator under vacuum. The polymer is then precipitated in an acetone/methanol mixture, filtered, then dried in an oven.

Table 1 summarizes the quantities of material and the yields obtained as a function of the targeted molar masses of polymer.

TABLE 1

| Targeted molar mass (g · mol−1) | Weight monomer (g) | Number of moles of monomer (mmol) | Number of equivalents of monomer | Conversion (%) |
|---|---|---|---|---|
| 10 000 | 0.8 | 4.2 | 46 | 98 |
| 50 000 | 4.3 | 21 | 230 | 92 |
| 100 000 | 8.7 | 42 | 460 | 98 |

The resulting polymer corresponds to the expected product of formula according to $^1$H NMR, $^{13}$C NMR, IR spectroscopy analyses and elementary analysis, the results of which are given below.

$^1$H NMR (200.13 MHz, CDCl$_3$) δ: 8-7.2 (m, Harom), 7-6 (m, Harom), 1-2 (m, CH3 and CH2) ppm IR (cm−1): 3300 (N—H), 1650 (C=Carom), 1550 (C=O), 1086 (C—S), 570 (C—Br) cm-1

Elementary analysis: C: 39.4; H: 4.3; Br: 21; N: 3.8; O: 10.3; S: 15.1; Na: 6.1.

EXAMPLE 3

This example illustrates the preparation of platinum particles bound to a carbon material of carbon black type (designated, in the formula below "Vulcan XC72"), represented by the formula below:

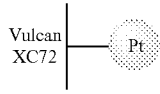

by a method involving a microemulsion known as "water-in-oil".

This preparation is conducted, in parallel, in two separate reactors. Into each reactor is poured heptane (18.71 g; 186.6 mmol) and Brij® 30 (5.30 g; 14.62 mmol). In parallel, a hexahydrated platinum salt H$_2$PtCl$_6$.6H$_2$O (275 mg; 0.212 mmol, 1 eq.) is dissolved in 2.5 mL of milliQ water. To each reactor is added 1 mL of the solution of metal salt then the whole is stirred so as to form a microemulsion. The resulting mixture is left to stand for a time extending from to 20 minutes. Sodium borohydride (116 mg; 3.1 mmol; 15 eq.) is added by half to each reactor. The mixture turns from orange to intense black. After stirring, the remaining portion of sodium borohydride is added. The resulting mixture is stirred manually then left to stand for 30 minutes. The reduction reaction is considered as finished from the moment that there is no longer any release of gas. The contents of the two reactors are combined in a beaker, the latter being covered with aluminum foil then placed in an ultrasonic bath for 10 minutes. Vulcan®XC 72 carbon black (120 mg) is added to the beaker. The latter is placed back in an ultrasonic bath for 30 minutes. Once the beaker has been removed from the ultrasonic bath, acetone is added (1 volume of acetone for one volume of microemulsion). The mixture is left to stand for several minutes then is filtered on a membrane made of Durapore hydrophilic polyvinylidene fluoride (PVDF) (0.22 μm; GVWP 04700) under vacuum. The platinum particles supported on the carbon material (carbon black) are washed by filtration by cycles of 3*30 mL of acetone, 3*30 mL of an acetone/water (50/50) mixture, 3*30 mL of water firstly then, secondly, by series (at least three) of 2*30 mL of acetone, 1*30 mL of an acetone/water (50/50) mixture and 2*30 mL of water. The particles obtained are then placed overnight in an oven at a temperature of 75° C.

The yield is quantitative.

The particles obtained are analyzed by elementary analysis attesting to the presence of carbon (at a rate of 60%) and platinum (at a rate of 40%), which demonstrates that the platinum particles are supported on the carbon material.

EXAMPLE 4

This example illustrates the preparation of platinum particles bound to a carbon material of carbon black type (designated, in the formula below, "Vulcan CX 72") by a method known as "Instant method"), said particles being able to be represented by the formula below:

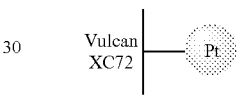

To do so, hexahydrated platinum salt H$_2$PtCl$_6$.6H$_2$O (259 mg; 0.50 mmol; 1 eq.) is dissolved in 10 mL of milliQ water, whereby a solution of metal salt is obtained. In parallel, in a 100 mL round bottomed flask equipped with a magnetic stirrer, lithium carbonate (111 mg; 1.5 mmol; 3 eq.) is dissolved in 30 mL of milliQ water. Vulcan®XC72 carbon material (146 mg) (corresponding to carbon black) is introduced into the round bottomed flask followed by the solution of metal salt. To obtain a final metal concentration of 10 mmol.L-1, 10 mL of water are added. The pH of the mixture is adjusted to a value of 9-10 by addition of lithium carbonate.

The reaction mixture is stirred at 500 rpm for 6 hours at 60° C. After 6 hours of reaction, the platinum particles oxide obtained are reduced by addition of a 100 mmol.L-1 cold solution of sodium borohydride (NaBH$_4$) (19 mg; 0.5 mmol; 1 eq.). The reduction step is carried out under a flow controlled by means of a pump, the output of which is set at 0.15 mL.min-1. Once returned to room temperature, the reaction mixture is filtered under vacuum then washed three times with milliQ water. The particles are recovered by filtration then are dried overnight in the oven at 75° C.

The yield is quantitative.

The particles obtained are analyzed by elementary analysis attesting to the presence of carbon (at a rate of 60%) and platinum (at a rate of 40%), which demonstrates that the platinum particles are supported on the carbon material.

EXAMPLE 5

This example illustrates the preparation of platinum particles prepared according to the preceding examples grafted by the polymer prepared in example 2, said grafted particles being able to be schematized by the formula below:

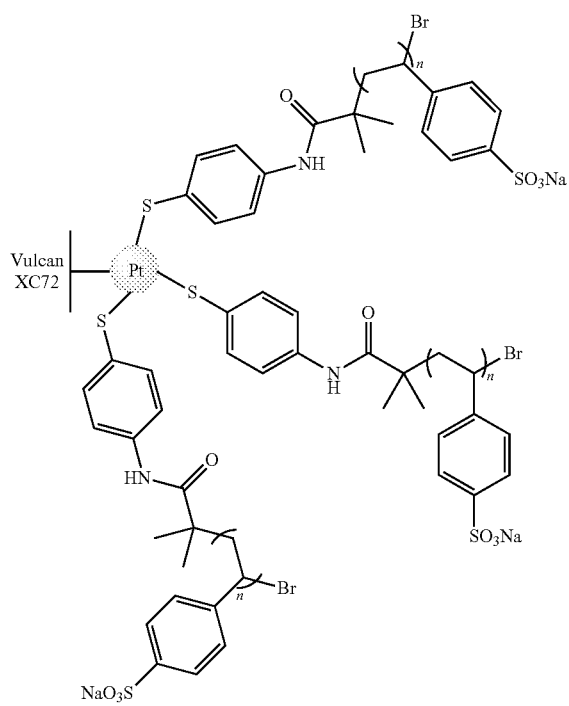

n indicating the number of repetitions of the unit taken between brackets.

In a round bottomed flask equipped with a magnetic stirrer, the platinum particles (the quantities used according to the different tests being explained in table 2 below) are suspended in 10 mL of hexylamine. The round bottomed flask is placed for 30 minutes in an ultrasonic bath, in order that the suspension of particles is homogeneous. The sodium polystyrene sulfonate obtained in example 2 is dissolved in water then added. The reaction mixture is stirred for 12 hours. The modified platinum particles are then washed and recovered by precipitation/centrifugation cycles, then dried overnight in an oven at 75° C.

TABLE 2

| Particles (mg) | 95 | 90 | 85 |
|---|---|---|---|
| Polymer (mg) | 10 | 20 | 30 |
| Mass % of grafted polymer | 5 | 10 | 15 |

EXAMPLE 6

This example illustrates the preparation of platinum particles supported on a carbon material and grafted by a polymer obtained according to example 2, the grafting as such being carried out in the synthesis medium of the supported platinum particles.

The particles thereby obtained may be schematized by the same formula as that represented in example 5.

The reaction scheme may be schematized in the following manner:

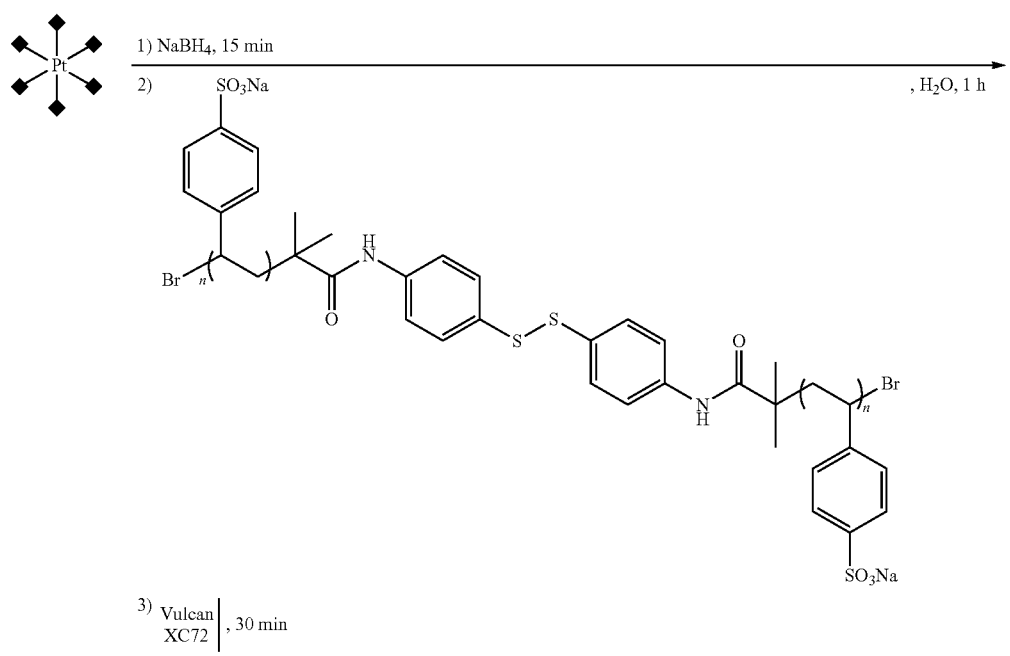

-continued

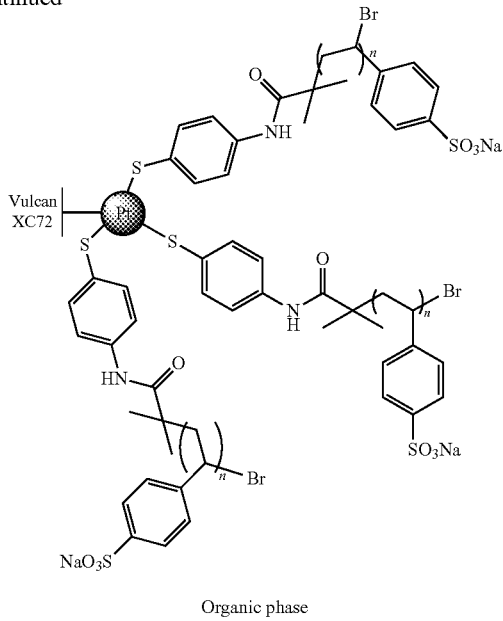

Organic phase

To do so, this preparation is conducted, in parallel, in two separate reactors. Into each reactor are poured heptane (18.71 g; 186.6 mmol) and Brij® 30 (5.30 g; 14.62 mmol). In parallel, a hexahydrated platinum salt $H_2PtCl_6.6H_2O$ (275 mg; 0.212 mmol, 1 eq.) is dissolved in 2.5 mL of milliQ water. To each reactor is added 1 mL of the solution of metal salt then the whole is stirred so as to form a microemulsion. The resulting mixture is left to stand for a time extending from 15 to 20 minutes. Sodium borohydride (116 mg; 3.1 mmol; 15 eq.) is added by half to each reactor. The mixture turns from orange to intense black. After stirring, the remaining portion of sodium borohydride is added. The resulting mixture is stirred manually then left to stand for 30 minutes. The reduction reaction is considered as finished, from the moment that there is no longer release of gas. The polymer prepared in example 2 dissolved beforehand is added to each reactor. The reactors are placed under stirring for 1 hour. The contents of the two reactors are then combined in a beaker, the latter being covered with aluminum foil then placed in an ultrasonic bath for 10 minutes. Vulcan®XC 72 carbon black is added to the beaker. The latter is put back in the ultrasonic bath for 30 minutes. Once the beaker has been removed from the ultrasonic bath, acetone is added (1 volume of acetone for one volume of microemulsion). The mixture is left to stand for several minutes then is filtered on a membrane made of Durapore hydrophilic polyvinylidene fluoride (PVDF) (0.22 µm; GVWP 04700) under vacuum. The platinum particles supported on the carbon material (carbon black) are washed by filtration by cycles of 3*30 mL of acetone, 3*30 mL of an acetone/water (50/50) mixture, 3*30 mL of water firstly then, secondly, by series (at least three) of 2*30 mL of acetone, 1*30 mL of an acetone/water (50/50) mixture and 2*30 mL of water. The particles obtained are then placed overnight in an oven at 130° C., in order to eliminate all traces of Brij®30.

Different tests have been implemented with different quantities of particles and polymer, these quantities being reported in table 3 below.

TABLE 3

| Particle (mg) | 110 | 100 | 90 |
| Polymer (mg) | 20 | 40 | 60 |
| Mass % of grafted polymer | 5 | 10 | 15 |

EXAMPLE 7

This example illustrates the preparation of platinum particles supported on a carbon material and grafted by a polymer obtained according to example 2, the grafting being carried out concomitantly with the synthesis of the particles.

The reaction scheme may be schematized in the following Manner:

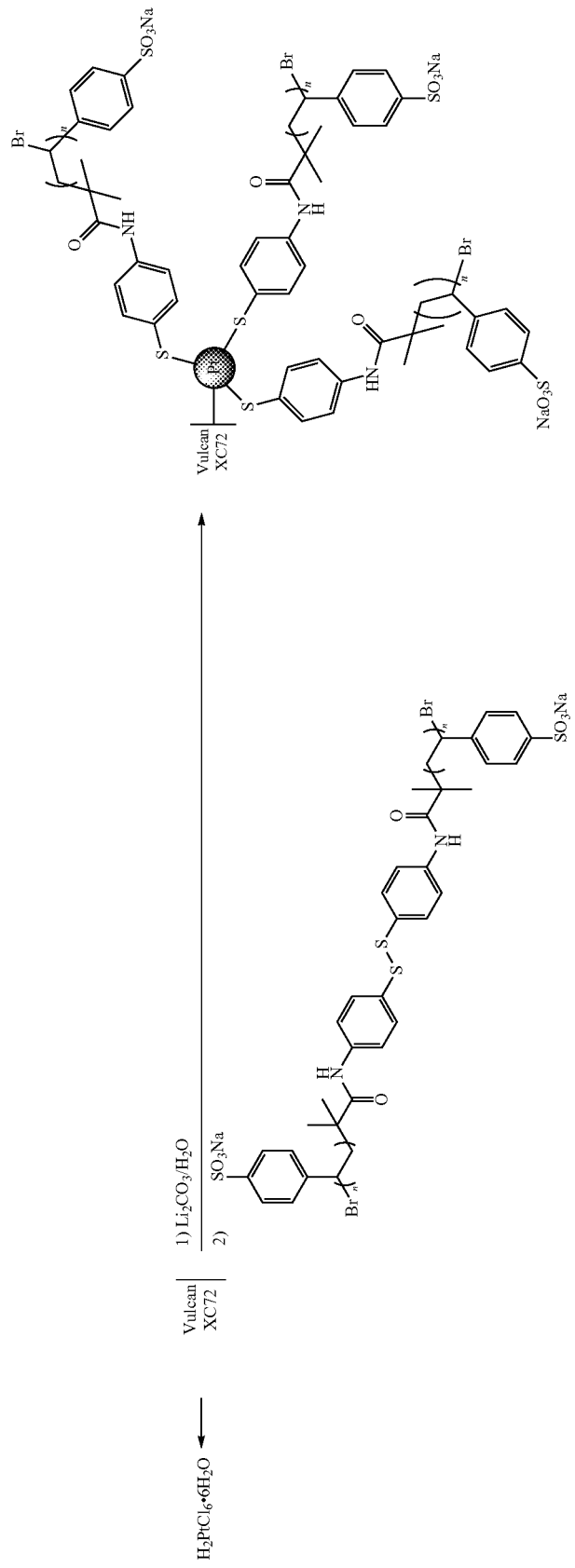

To do so, hexahydrated platinum salt $H_2PtCl_6.6H_2O$ (259 mg; 0.50 mmol; 1 eq.) is dissolved in 10 mL of milliQ water, whereby a solution of metal salt is obtained. In parallel, in a 100 mL round bottomed flask equipped with a magnetic stirrer, lithium carbonate (111 mg; 1.5 mmol; 3 eq.) is dissolved in 30 mL of milliQ water. Vulcan®XC72 carbon material (146 mg) is introduced into the round bottomed flask followed by the solution of metal salt and the polymer prepared in example 2 dissolved in water. To obtain a final metal concentration of 10 mmol.L-1, 10 mL of water are added. The pH of the mixture is adjusted to a value of 9-10 by addition of lithium carbonate.

The reaction mixture is stirred at 500 rpm for 6 hours at 60° C. After 6 hours of reaction, the reduction is carried out with a 100 mmol.L-1 cold solution of sodium borohydride ($NaBH_4$) (19 mg; 0.5 mmol; 1 eq.). The reduction step is carried out under a flow controlled by means of a pump, the output of which is set at 0.15 mL.min-1. Once returned to room temperature, the reaction mixture is filtered under vacuum then washed three times with milliQ water. The particles are recovered by filtration then are dried overnight in an oven at 75° C.

Different tests have been carried out, varying the quantities of polymer, these quantities being reported in table 4 below.

TABLE 4

| Polymer (mg) | 20 | 40 | 60 |
|---|---|---|---|
| Mass % of grafted polymer | 5 | 10 | 15 |

EXAMPLE 8

The particles obtained according to example 6 are subjected to different analyses so as to analyze:
the thermal resistance of said particles;
the structural characterization of said particles;
the electrochemical characterization of said particles; and
fuel cell test of said particles.

a) Thermal Resistance

Thermogravimetric analysis makes it possible to highlight the thermal stability of the particles. The analysis is conducted under air, with a variation of the temperature from 25° C. to 800° C.

The analysis highlights that, up to 300° C., no degradation is visible, which makes it possible to envisage the use of the particles.

b) Structural Characterization of these Particles

The characterization of the particles by transmission electron microscopy makes it possible to have an image representative of said particles at different scales. The images obtained highlight, on the one hand, the distribution of the platinum nanoparticles on the carbon material, and, on the other hand, the presence of the grafted organic crown constituted of the polymers grafted to the particles.

The images are taken after the heat treatment of the particles to ensure that what is visible in microscopy is indeed the polymer and not the Brij®30.

The images obtained highlight good dissemination of the platinum nanoparticles on the carbon support, which demonstrates that the presence of the organic crown does not limit this step of formation of platinum nanoparticles during the "water-in-oil" microemulsion synthesis. The greater the enlargement, the more precise the image of the grafting of the sodium polystyrene sulfonate may be obtained. Furthermore, from an enlargement equal to 600 000, the presence of the organic crown is visible. It appears clearly that the polymer coats the nanoparticles of platinum.

c) Electrochemical Characterization of the Particles

The characterization of the resistance of the organic crown was conducted in support medium (argon) with a cell with three electrodes. In this cell, the reference electrode is a reversible hydrogen electrode (RHE) in which the electrochemical potential is fixed and known. The second electrode is an auxiliary electrode known as counter electrode (CE) constituted of an inert material, a wafer of vitreous carbon in our case, and which serves for current collection. The third electrode is a working electrode (WE) on which is situated the studied catalyst. A gas input and output system (AG/SG) is added in order to work in controlled atmosphere. The measurement is carried out by cycling of the electrode potential between 0.05 V vs RHE and an upper potential limit successively equal to 0.55 V vs RHE (only faradic phenomena of adsorption/desorption of hydrogen occur above this potential range, the currents recorded between 0.4 V and 0.55 V vs HRE being due to the phenomenon of double layer capacitance), 0.8 V vs RHE (potential situated just before the start of the reaction of oxidation of the platinum surface), 1.0 V vs RHE (potential situated after the start of the reaction of oxidation of the platinum surface, and corresponding to the potential of the cathode of a PEMFC in open circuit) and 1.2 V vs RHE (highly oxidizing potential).

During successive scans going through electrode potentials above 1.0 V vs RHE, the currents observed in the adsorption/desorption zone increase until the current values recorded on an electrode of Vulcan XC72/Pt type is obtained. This observation suggests that the organic crown that surrounds the platinum is degraded when the potential applied is above 1.0 V vs HRE. Conversely, when the scans do not exceed 1 V vs HRE, the currents recorded are stable and characteristic of a modified platinum surface, which confirms the presence, after several cycles, of the organic crown.

Catalytic activity and selectivity are important properties in the choice of the catalyst.

The characterization of materials in oxygen-saturated acid medium makes it possible to study their catalytic behavior vis-à-vis the oxygen reduction reaction. The appearance of the voltammograms is equivalent to that obtained for catalysts of the Vulcan XC72/Pt type. For all the characterized materials, the total number of exchanged electrons is equal to 4 between 0.7 and 0.4 V vs HRE. The reduction of oxygen is thus complete to form water.

Selectivity, for its part, defines the capacity of a catalyst to transform precise reagents into a given product. In the case of the oxygen reduction reaction, two products may be formed: water and hydrogen peroxide.

In so far as the intended application for the studied catalysts is their incorporation at a fuel cell cathode for "transport" or "portable systems" applications, thus requiring a long lifetime (around 5000 hours for the "transport" application) or operating near to human beings, the selectivity appears as a determining factor for reasons of durability of systems and safety. In fact, hydrogen peroxide is an oxidizing product which could, in the long term, cause irritations of the skin or the eyes.

In addition, the production of hydrogen peroxide from oxygen takes place by the exchange of two electrons compared to four electrons exchanged to produce water. Thus, the reduction of oxygen into hydrogen peroxide leads to the consumption of a quantity of oxygen two times greater compared to the reaction of reduction of oxygen into water for a given fuel cell operating power. If the fuel cell is supplied by ambient air, the diffusion of oxygen from the ambient medium up to the catalytic layer may become a limiting factor for the operation of the fuel cell. It is thus advisable to consume it by a reaction involving the greatest number of exchanged electrons.

For the elaboration of a fuel cell, the selectivity of the cathodic catalyst used must therefore be determined with precision.

The calculation of the proportions of water and peroxide produced during the reaction makes it possible to determine the mechanism. Hydrogen peroxide is only produced from 0.8 V vs HRE. This implies a direct reduction of oxygen into water in the range of potentials extending from 1.1 to 0.8 V vs HRE. For lower potentials, the proportion of peroxide rises to 5%, which is entirely compatible with a fuel cell use.

d) Fuel Cell Test

The fuel cell tests are carried out with a Nafion NR212 membrane, in different conditions in order to observe the effect of the organic crown on the surface of the platinum nanoparticles.

The polarization curves obtained highlight that, for low current densities, the presence of the polymer at the surface of the platinum nanoparticles improves the catalytic performances of the material. For example at 0.2 A.cm$^{-2}$, the voltage obtained for the catalytic materials of the invention is equal to 0.77 V in the case where there is 10% of Nafion® in the catalytic ink and equal to 0.75 V in the case where there is no Nafion®. For a Vulcan XC72/Pt type catalyst synthesized by the "water-in-oil" microemulsion method, at this current density, the voltage is 0.73 V.

When the cathode does not contain Nafion®, current density values above 0.8 A cm−2 have been able to be applied to the fuel cell system. This confirms that the proton conduction is provided by the polymer grafted onto the surface of the nanoparticles of platinum and the validity of the transposition of the problem of the triple point at the molecular level. Similarly, the performances of the fuel cell increase with the Nafion® content up to 10%, then drop off for higher contents. The presence of the polymer grafted onto the surface of the nanoparticles of platinum makes it possible to reduce the quantities of Nafion® to introduce into the formulation of the catalytic ink to optimize the performances.

What is claimed is:

1. A method for preparing platinum particles being functionalized by polymers comprising at least one repeating unit bearing at least one proton-conducting group, and being covalently bonded to a carbon material, said method comprising:

a step of ATRP polymerization of at least one monomer of formula (III):

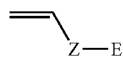

(III)

in which:
Z corresponds to a phenyl group, and
E corresponds to a proton-conducting group,
with an initiator compound comprising a disulfide group —S—S— forming a bridge between two portions of said compound, said two portions being identical and comprising a phenyl group bearing an amide group —NH—CO—R$^1$, wherein R$^1$ is a hydrocarbon group having at least one halogen atom, whereby it is obtained a polymer comprising at least one repeating unit bearing at least one proton-conducting group corresponding to group E and comprising at least one portion corresponding to an organic radical of the initiator compound, said radical comprising at least one group capable of being grafted onto the surface of platinum particles; and a step of contacting platinum particles with said polymer, whereby particles onto which polymers are grafted, are obtained.

2. The method according to claim 1, in which the organic radical of initiator compound is a radical derived from a compound of formula (I) below:

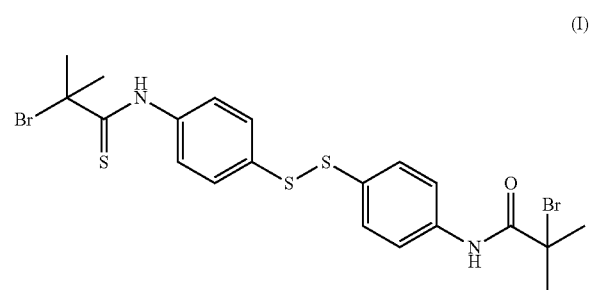

(I)

this radical thus meeting the following formula (II):

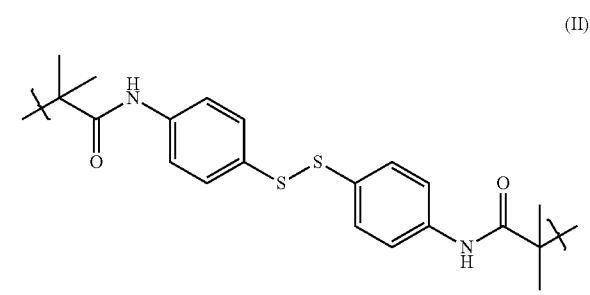

(II)

the braces indicating the places at which said radical is fixed, in this case to a first polymer chain and to a second polymer chain.

3. The method according to claim 1, in which the polymer meets the following formula (V):

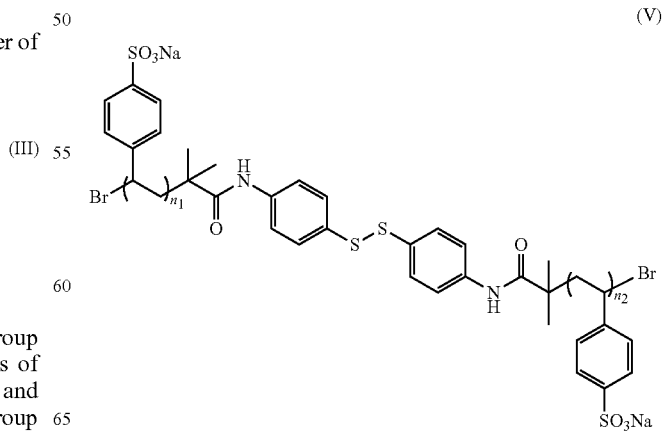

(V)

this polymer comprising a first polymer chain and a second polymer chain bound on either side of the radical of formula (II) as defined in claim 2, $n_1$ and $n_2$ corresponding to the number of repetitions of the unit taken between brackets.

4. The method according to claim 1, in which the carbon material is selected from graphite, carbon black, carbon fibers, carbon tubes, graphene and mixtures thereof.

5. The method according to claim 1, further comprising, before said step of ATRP polymerization, a step of preparing particles comprising platinum bound to a carbon material.

6. Method The method according to claim 1, further comprising, after said step of ATRP polymerization, a step of contacting the particles obtained as a result of said step of ATRP polymerization with the carbon material, whereby said particles are bound, at the end of said contacting step, to the carbon material.

7. The method according to claim 1, comprising a step of preparing particles comprising platinum concomitantly with step a).

* * * * *

UNITED STATES PATENT AND TRADEMARK OFFICE
CERTIFICATE OF CORRECTION

PATENT NO. : 9,446,392 B2
APPLICATION NO. : 14/355925
DATED : September 20, 2016
INVENTOR(S) : Buvat et al.

Page 1 of 3

It is certified that error appears in the above-identified patent and that said Letters Patent is hereby corrected as shown below:

On the Title Page

In item (73), please delete "COMMISARIAT" and replace it with -- COMMISSARIAT --

In the Specification

In Column 16, Lines 37-46: please delete

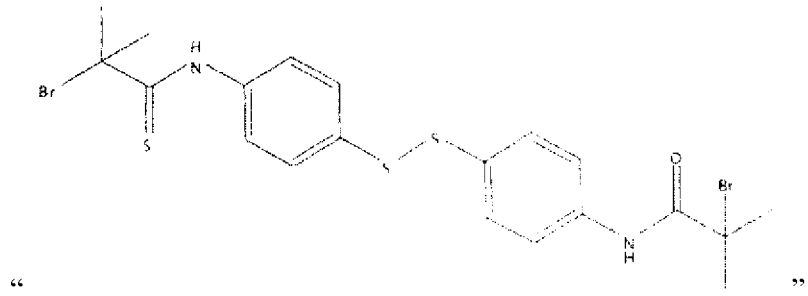

" "

and replace it with

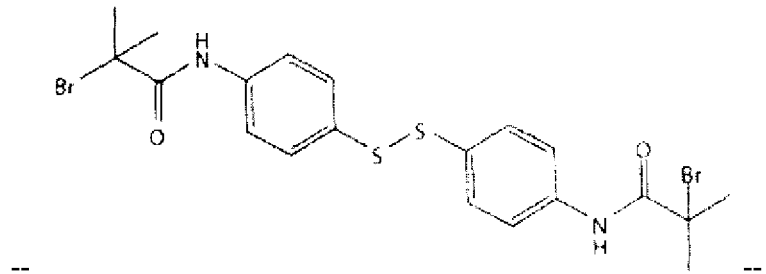

-- --

Signed and Sealed this
Twentieth Day of June, 2017

Joseph Matal
*Performing the Functions and Duties of the
Under Secretary of Commerce for Intellectual Property and
Director of the United States Patent and Trademark Office*

In Column 16, Lines 61-64: please delete
"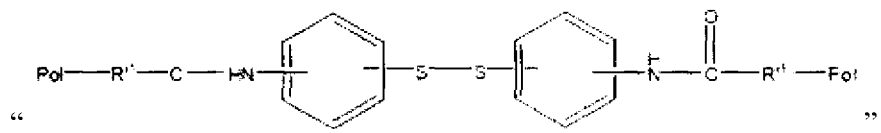"
and replace it with
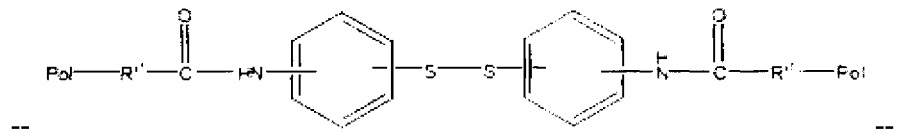
--                                                                                                              --
In Column 18, Lines 21-30: please delete
"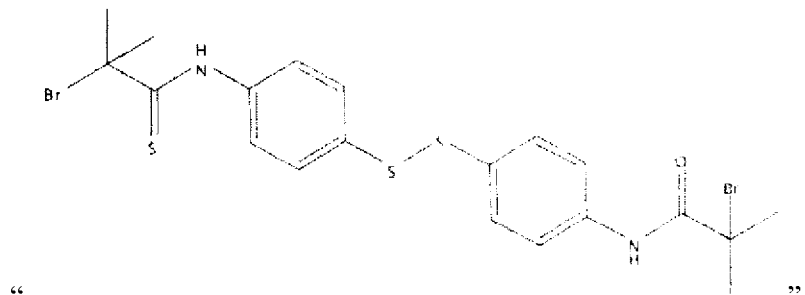"
and replace it with
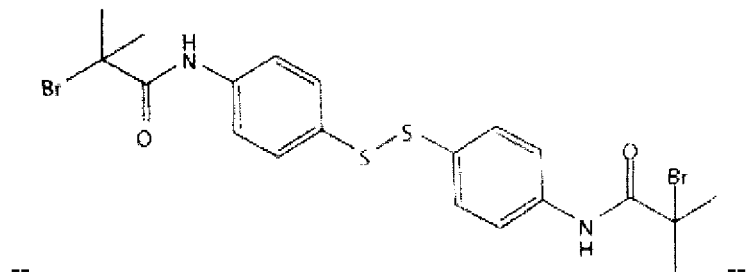
--                                                                                                              --
In Column 20, Line 59: please delete "table" and replace it with -- table 1 --
In Column 21, Line 54: please delete "from to" and replace it with -- from 15 to --

CERTIFICATE OF CORRECTION (continued)
U.S. Pat. No. 9,446,392 B2

In the Claims

In Column 32, Lines 17-26: please delete

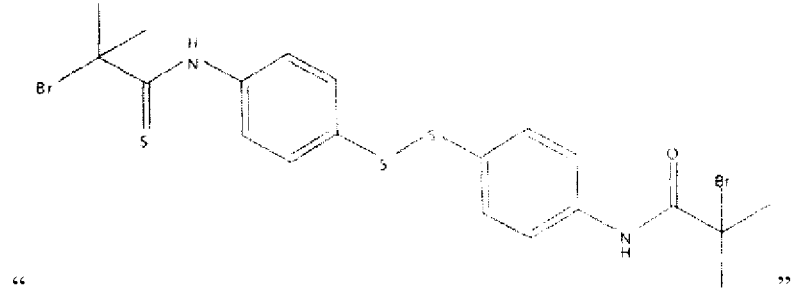

" "

and replace it with

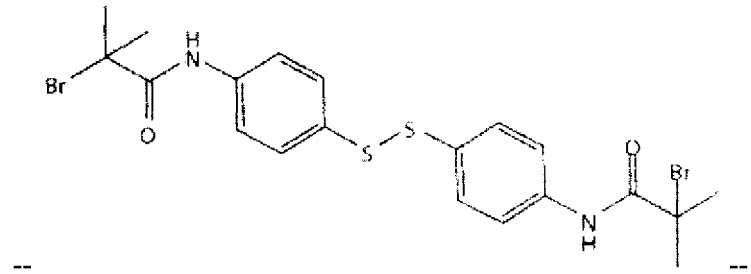

-- --